Feb. 2, 1960  R. MAYER  2,923,146
ADJUSTABLE ANCHOR FOR FIXTURES
Filed March 31, 1955
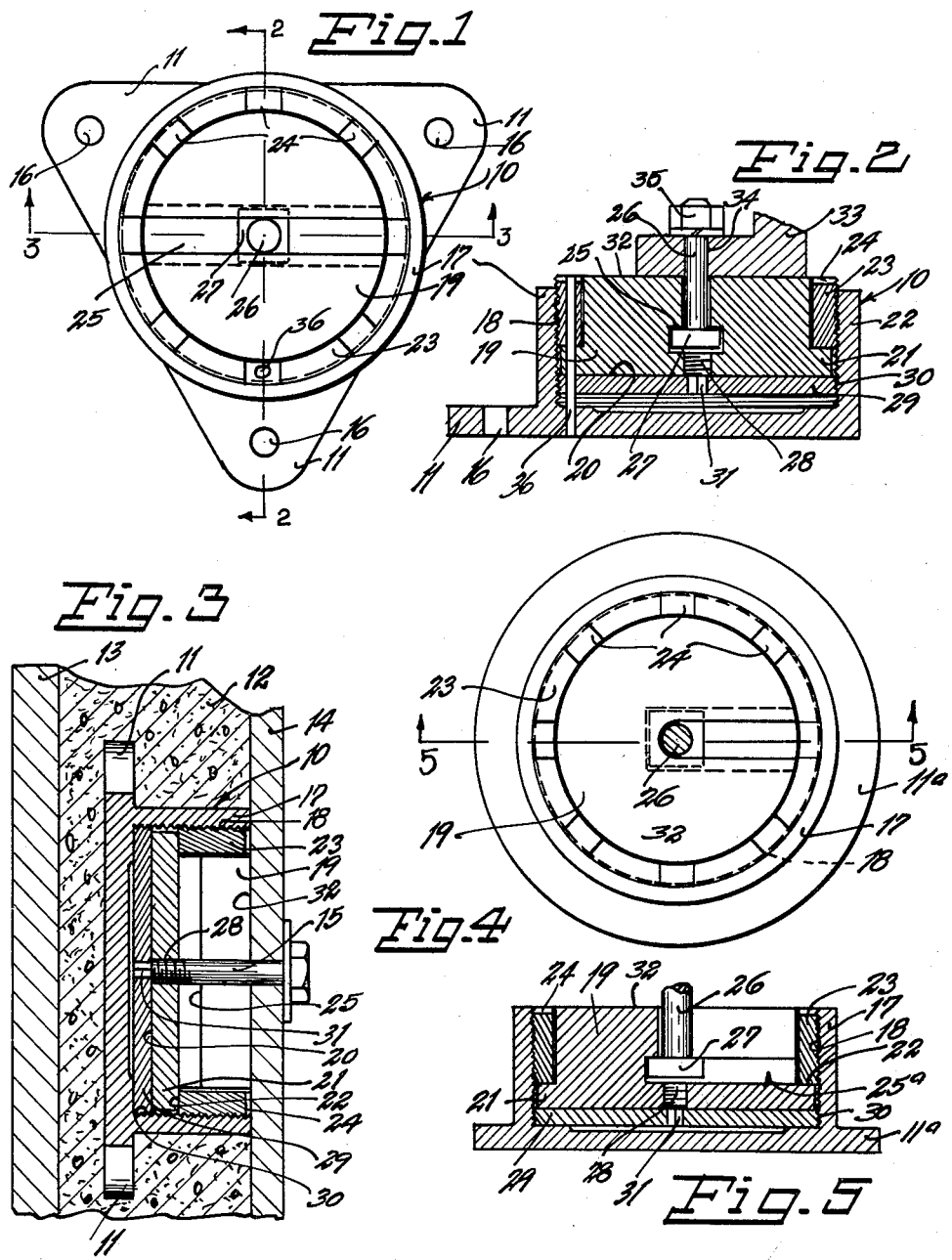
INVENTOR.
Richard Mayer
BY
Fish and Huff

United States Patent Office 2,923,146
Patented Feb. 2, 1960

2,923,146

ADJUSTABLE ANCHOR FOR FIXTURES

Richard Mayer, Richland, Wash., assignor to Adjustable Anchor Corporation, a corporation of Washington Application March 31, 1955, Serial No. 498,359

3 Claims. (Cl. 72—105)

This invention is an adjustable anchor for fixtures and constitutes a continuation in part of my co-pending application Serial No. 445,836 filed July 26, 1954, for an improved fixture anchor, now abandoned.

In present day practice when installing large heavy machinery or fixtures, it is conventional to provide a base so that upon receipt of the fixture, it may be placed upon the base and anchored by means of J-bolts set in the concrete of the base. The manufacturer of the fixture usually supplies a template or drawing which discloses the location of the apertures in the feet of the fixture so that the location of the J-bolts may be predetermined and anchored to make the base available for setting the fixture thereupon when received.

It is found that in actual practice the bolts when located by this means do not always fit the apertures present in the feet of the fixture, and therefore it becomes necessary to remove the bolts and reset them or bore additional holes in the feet of the fixture to correspond to the bolts as previously set. This of course requires an expenditure of much time and labor, and therefore increases the cost of installing heavy equipment.

It is therefore one object of this invention to provide fixture anchoring means wherein the several fixture fasteners may be manually movable to adjusted positions, thus permitting the fasteners to be moved to coincide to the fastening apertures found in the feed of the fixture or machine to be anchored.

It is also found to be necessary in many instances to level machines accurately to cause them to function properly. This is quite difficult to do when employing a poured cement base, as very slight variations and shrinkage of the concrete during setting can affect its surface level, therefore it is another object of the invention to provide a fixture anchor which not only has fixture fasteners movable along the supporting surface to fit the apertures of the supporting feet, but also has a means for adjusting an element of the fixture fastener to insure proper leveling or aligning of the machine.

Another object of the invention lies in the provision of a fixture anchor which has an element adapted to be securely fixed in a predetermined position known to be approximately that required for anchoring the fixture and having a manually movable fixture fastener adapted for securing to a fixture and adjustable within limits to a selected position prior to being secured, and thereafter securable to rigidly unite the element, fastener and fixture.

Another object of the invention lies in the provision of a fixture anchor having a manually adjustable fastener which permits the housing to be securely fixed and the fastener adjusted to the fixture to be anchored so that great accuracy in anchoring the housing is not necessary, since any slight horizontal or vertical displacement of the device may be compensated for by the movable fastener and the rotatable member of the fixture.

Another object of the invention lies in the provision of a fixture anchor which comprises a minimum number of parts assembled with facility at a minimum of expense in labor and material.

These and other important objects of the invention will become apparent during the course of the following description. The nature and advantages of the present invention will appear more fully from the following description and accompanying drawings, wherein a preferred form of the improved invention is shown, accompanied by a modified form. It should be understood, however, that the drawings and description are illustrative only and are not intended to limit the invention except insofar as it is expressed in the claims appended to this specification and as required in view of the prior art.

In the drawings:

Figure 1 is a top plan view of a fixture anchor embodying the present invention;

Figure 2 is a vertical cross section taken at the diameter of the fixture anchor on the plane indicated by line 2—2 of Figure 1 and showing the foot of a fixture anchored thereto;

Figure 3 is a vertical cross section taken at the diameter of the fixture anchor on the plane indicated by line 3—3 of Figure 1 and showing the anchor secured in a concrete wall intermediate forms thereof;

Figure 4 is a plan view of a modified fixture embodying the present invention; and Figure 5 is a vertical cross section taken on the plane of line 5—5 of Figure 4.

Referring now in detail to the drawing, the numeral 10 designates an integral fixable element or unitary housing which is adapted to be secured preferably by disposing the flanges 11 in a concrete base 12. In Figure 3 I have shown the base to be a vertical side wall which has the forms 13 and 14 still in place. To locate the fixture anchor, I secure it by means of a stub bolt 15 which passes through a bored hole in the form 14 and releasably secures the fixture anchor to the form.

It will be noted that the flanges 11 are provided with bores 16 to adapt the anchor to be secured to a wooden base by means of bolts or lag screws, or to provide means for tying the anchor to the reinforcing rods of a concrete base.

It will be noted that the housing 10 has an annular upstanding wall 17 which is internally threaded at 18 for substantially its full depth and defines a cylindrical recess or well in which a rotatable member 19 is disposed. At its inner end face 20 the rotatable member 19 is provided with an annular peripheral flange 21 which defines a shoulder 22 disposed toward the outer face 32 of the member 19.

An axially elongated externally threaded locking ring 23 is associated with the internal threads 18 of the housing 10, and bears against the shoulder 22 to selectively dispose the rotatable member 19 successively at various axial positions with relation to the housing 10. It will be noted that the ring is provided with a plurality of circumferentially spaced radially extending slots 24 by means of which the ring may be rotated through the employment of a special wrench or a hammer and shaft.

In its preferred form, the rotatable member 19 is provided with a diametrically extending inverted T-shaped undercut way 25 which extends completely through the rotatable member, opening at each end in the peripheral face thereof and providing access for the bolt or fastening element 26 which has a square head 27 cooperating with the way 25 so that the fastening element 26 may be reciprocally associated with the rotatable member 19 for movement along the way 25, but axial movement from the rotatable member is precluded by cooperative action of the head 27 and the undercut portion of the way 25. At the axis of the rotatable member 19, I provide an internally threaded bore 28 which communicates the way 25 with the inner face 20 of the rotatable member.

Within the housing 10 and immediately below the rotatable member 19, I provide a supporting plate 29 which is externally threaded on its peripheral edges at 30 and cooperates with the internal threads 18 of the housing 10. At its axis, the support plate 29 is provided with an irregular opening 31, here shown to be square, and having a generally diminished circumference with relation to the internally threaded bore 28. It is therefore obvious that a rod having an end adapted to cooperate with the opening 31 may be inserted into the opening for turning the plate 29 through the bore 28 and by rotation thereof, the plate 29 may be adjusted toward a supporting position to properly clamp the rotatable member 19 between the ring 23 and the plate 29.

It will thus be seen that the outer face 32 of the rotatable member 19 may be disposed at various elevations within limits to properly level a machine, one supporting foot of which is shown at 33, thus avoiding the use of shims or other leveling schemes. The fastening element 26 extends through a bore 34 formed in the foot 33, and a nut and lock washer unit 35 rigidly unite the fixture foot 33 to the anchor 10.

When a fixture is of the type having moving parts wherein vibration is imparted to the foot 33, I provide a means of locking all of the elements, i.e., the housing 10, rotatable member 19, ring 24, and plate 29 together, which comprises boring a hole downwardly through the ring 24, the flange 21 of the rotatable member 19, a peripheral edge portion of the plate 29, and into the inner wall of the housing 10, and subsequently inserting a pin 36. It will thus be seen that vibrations from the machinery will not effect relative displacement of the various parts and therefore the setting will not change.

When it is desired to dispose the fixture anchor in a wall, the fixture anchor 10 is fastened to the form 14 by means of the bolt 15 which threads into the internally threaded bore 28 of the rotatable member, thus clamping the normally open end of the housing 10 to the form and precluding plastic concrete from entering therein. When the forms are removed, the fixture anchor is obviously disposed flush with the surface of the wall as desired.

In the event the fixture anchor is placed in the floor and it is subsequently found that it will not be needed for supporting a machine, or when the floor area is converted to different use, the rotatable member 19 may be inverted within the housing 10 after the ring 24 is threaded to its lowermost position, and the greater circumference of the inner face 20 may be disposed upwardly, thus precluding any appreciable interruption in the floor surface.

In Figure 4 and 5, a modified form of the invention is disclosed wherein the undercut way 25a is seen to extend radially from the circumference of the rotatable member 19 to the axis thereof, and in this form it is obvious that the fastening element 26 may also be positioned at any point within the limits of the ring 23.

It will also be noted that the flange 11a (Figures 4 and 5) may take other shapes than that shown in Figure 1.

Having thus describing my invention, I claim:

1. A fixture anchor for heavy equipment comprising an element fixable in a predetermined position and having an internally threaded cylindrical well; a support disc in said well having peripheral threads cooperating with said first named threads, whereby rotation of said disc relative to said element moves said disc axially of the cylindrical well; means at the center of said disc whereby it may be manually rotated; an annular rotatable member coaxially supported upon said disc and having an annular shoulder disposed away from said disc toward the outer face of said member; an axial bore in said rotatable member providing access to the means for rotating said disc; a clamping ring threadedly associated with said internal threads, encircling the outer end portion of said rotatable member and impinging against said shoulder to clamp said rotatable member according to manual selection; and a fixture fastener slidingly engaged with said rotatable member and movable athwart of its rotational axis.

2. A fixture anchor comprising an element fixable in a predetermined position and having an internally threaded cylindrical well; a support disc in said well having peripheral threads cooperating with said first named threads, whereby rotation of said disc relative to said element moves said disc axially of the cylindrical well; means at the center of said disc for effecting manual rotation thereof; an annular rotatable member coaxially supported upon said disc and having an annular shoulder disposed away from said disc toward the outer face of said member; said rotatable member having an undercut way athwart of its axis of rotation and opening in the peripheral face thereof; said rotatable member having an axial bore opening in said way and the inner face of said rotatable member; a clamping ring threadedly associated with said internal threads, encircling the outer end portion of said member, and impinging against said shoulder to clamp said rotatable member according to manual selection; and a fixture fastener slidably secured to traverse said way for securing a fixture.

3. The invention as defined in claim 2 wherein the axial bore of said rotatable member is internally threaded.

References Cited in the file of this patent

UNITED STATES PATENTS

| | | |
|---|---|---|
| 1,463,863 | Zents | Aug. 7, 1923 |
| 1,637,210 | Betts | July 26, 1927 |
| 1,705,739 | Selah | Mar. 19, 1929 |
| 1,761,800 | Preis | June 3, 1930 |
| 2,095,832 | Retzke | Oct. 12, 1937 |
| 2,197,889 | Katcher | Apr. 23, 1940 |

FOREIGN PATENTS

| | | |
|---|---|---|
| 142,391 | Great Britain | May 6, 1920 |
| 421,984 | Great Britain | Jan. 3, 1935 |